Aug. 22, 1950     G. W. JARGSTORFF ET AL     2,519,375
METHOD AND APPARATUS FOR MOLDING TUBING
Filed Feb. 16, 1946     2 Sheets-Sheet 1

INVENTORS
GEORGE W. JARGSTORFF
CHARLES A. JOSLIN
BY
ATTORNEY

Aug. 22, 1950   G. W. JARGSTORFF ET AL   2,519,375
METHOD AND APPARATUS FOR MOLDING TUBING
Filed Feb. 16, 1946   2 Sheets-Sheet 2

INVENTORS
GEORGE W. JARGSTORFF
CHARLES A. JOSLIN
ATTORNEY

Patented Aug. 22, 1950

2,519,375

UNITED STATES PATENT OFFICE 2,519,375

METHOD AND APPARATUS FOR MOLDING TUBING

George W. Jargstorff, Glen Rock, and Charles A. Joslin, New Brunswick, N. J., assignors, by mesne assignments, to Union Carbide and Carbon Corporation, a corporation of New York Application February 16, 1946, Serial No. 648,150

18 Claims. (Cl. 18—14)

This invention relates to the plastic molding of organic thermoplastic materials, and more particularly it is concerned with the formation of continuous molded tubular shapes by extrusion methods and apparatus.

The extrusion molding of thermoplastic substances, such as the synthetic plastics including cellulose esters, vinyl polymers and copolymers, as well as rubber and other natural plastic materials is a well known art. It is also conventional to modify the extrusion apparatus for the production of tubular products in continuous lengths; such modification consists of an extrusion pin mounted within the heating head or delivery end of the extruder and cooperating with a complementary die to form an annular opening through which the thermoplastic material in a heat-softened condition is formed and shaped into tubular form.

In the production of thin-walled thermoplastic tubing, air at low pressure is introduced into the hot tubing as it emerges from the extruder to prevent collapse or other undesired deformations of the tubing walls while the thermoplastic material is cooling and solidifying. The low pressure air is usually supplied to the tubing through a porting system in the extrusion pin. The air pressure, however, must be carefully regulated to avoid over-inflation or blowouts of the tubing. In practice such regulation is attended with manifold problems created by the fluctuating temperature of the extruded thermoplastic material, the extrusion speed, and the rheological properties of the particular thermoplastic material, all of which have a several and joint contributory influence to be accounted for in regulating the pressure of the internally introduced air.

Control of the diametrical size and the shape of the tubing while inflated with air and during the cooling stage is obtained by passing the tubing through cooling dies external to the extruder. The operation is preferably conducted by allowing the internally introduced air to expand the tubing somewhat after it emerges from the extruder, and then completing the expansion to size within the cooling die whose internal molding dimensions are larger than the annular molding space of the extruder die combination.

Despite the bell mouth entrances generally provided on cooling dies to ease the passage of the inflated tubing into and through the cooling dies, the tubing occasionally over-expands or jams at the entrance, especially when it has been over-inflated or is in an extremely soft and sticky plastic state. Sticking also frequently occurs within the cooling die thus causing rupture and/or scuffing of the tubing when excessive pulling tension is applied to draw the tubing through the die.

An object, therefore, of the present invention is an improved method and apparatus for producing thermoplastic tubing in a continuous manner and with precise dimensions.

Another object of the invention is a method and apparatus for substantially eliminating the adhesion or sticking of hot organic thermoplastics to cooling die surfaces.

Still another object of the present invention is a method and apparatus for controlling the expansion of the tubing induced by the internally introduced air, prior to the tubing contacting the cooling die. Other objects will appear hereinafter.

The invention is dependent upon the discoveries that sticking of the hot plastic tubing to the cooling die surfaces can be from substantially to completely eliminated by contact of the hot tubing with an elastic fluid before it is passed through a cooling die that moreover has a discontinuous molding surface in place of the conventional high polished molding surface. The invention also embodies the discovery that blowouts or over-expansion of the hot tubing prior to it contacting a cooling die provided with discontinuous molding surfaces can be successfully prevented by maintaining the elastic fluid in contact with the tubing emerging from the extruder at a slightly lower pressure than the air or other elastic fluid internally introduced within the tubing for expansion and supporting purposes.

The discontinuous molding surface of the cooling die can be obtained in various ways, such as by etching, by mechanically abrading a polished die surface by abrasives or lathe tools, or by pressing metal powders into a suitable shape followed by sintering of the pressed shape to cause partial fusion of the metal particles whereby a coherent but porous mass is obtained. The objective is to produce a generally even or level molding surface but having a multiplicity of minute depressed areas such as shallow pits or pores whereby any plastic material in sliding contact with such surface makes frictional contact with individual level areas but because of the presence of the depressed areas does not make a continuous contact as with the conventional uninterrupted highly polished mold surfaces; it is a surface of this character that is intended by the term "discontinuous."

Although a mold surface as thus described might normally be expected to cause a greater amount of sticking than a smooth, highly polished mold surface, surprisingly no sticking occurs or, if any, it is of negligible proportions insufficient to interfere with continuous production of tubular shaped thermoplastic material or to mar the surface appearance of the molded tube. A possible explanation for this apparent contradiction is that by initially exposing the external surface of the tubing to elastic fluid before contacting the cooling die, some of the elastic fluid accompanies the tubing as an adsorbed film in its passage through the cooling die to function therein as a non-liquid lubricating film between the external surface of the tubing and the depressed areas of the cooling die to thereby prevent the tubing from expanding into contact with the depressed areas of the molding surfaces that would otherwise function as undercuts to cause objectionable sticking or scuffing of the tubing.

A preferred discontinuous molding surface is one prepared by first developing on carbon steel or stainless steel a conventional polished mold finish and then subjecting this surface to the action of an etching fluid to obtain a light etch on the polished surface sufficient to dull its luster; the resultant etched or matte surface finish, depending upon the action of the particular etching fluid and the tube material consists of shallow pits either intercommunicating or individual. Therefore the normally high specific adhesion of hot plastic to the surface can only occur at a multiplicity of small areas and not over a continuous area of mold surface; conjointly therewith is the selective wetting or adsorption by the mold surface of the elastic supporting fluid in preference to the hot thermoplastic material.

Another preferred form of discontinuous molding surfaces has been found to exist in pressed and sintered metal powder shapes having smooth but porous surfaces such as are commercially available in the form of tubular shapes. The sintered metal shapes may be factory impregnated with lubricating oil but the presence or absence of such lubricating oil within the pores of the tube is not essential for use as a cooling die in the manner herein described.

The method is hereinafter described in greater detail with reference to the continuous extrusion of thermoplastic materials into tubular shaped bodies; and in connection therewith, two forms of suitable apparatus are shown in the accompanying drawing in which Fig. 1 is a diagrammatic horizontal sectional view of an extruder head to which has been attached means for inflating extruded tubing, means for introducing an elastic fluid to support and retard the expansion of the tubing, and means for shaping and cooling the expanded tubing;

Figure 1:
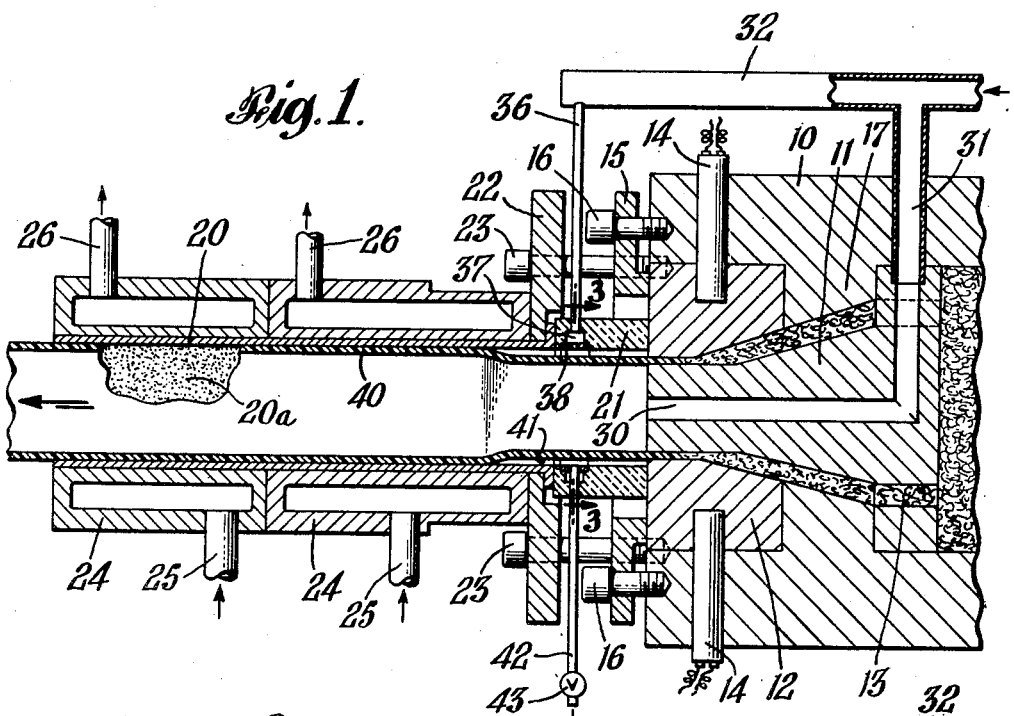

Referring to Fig. 1, there is shown a heating head or delivery end 10 of an extruder in which head is mounted a forming pin or mandrel 11 and a complementary annular die 12 for extruding thermoplastic material 13 in tubular shape. Electric cartridge heaters 14 are provided for maintaining the die 12 at suitable extrusion temperatures in conformity with the requirements of individual thermoplastic materials. The die 12 is held in proper position in the heating head 10 by a retainer flange 15 bearing against the exposed face of the die 12, the flange 15 being secured to the heating head 10 by bolts 16. The forming pin 11 is held in position in the heating head 10 by a spacer ring 17 which is a part of the heating head 10, or by other convenient means.

A tubular forming and cooling sleeve die 20 comprising a metal tube flanged on the end adjacent to the heating head 10 abuts against a bushing 21 made from a suitable heat insulating material, such as asbestos board, to minimize heat transfer from the heating head 10 to the cooling sleeve 20. The bushing 21 has a bore therethrough in alignment with and substantially of the same diameter as the bore of the cooling sleeve 20. The inner surface of the sleeve 20 is polished to remove machine and tool marks of excessive depth and then lightly acid etched to form a dull or matte surface 20a. The bushing 21 and cooling sleeve or die 20 are held in position against the face of the annular die 12 by a retaining flange 22 bearing against the flanged end of the cooling sleeve 20, the flange 22 being secured by bolts 23 whose threads engage with bored and tapped openings in the heating head 10.

Around the shaping and cooling sleeve 20 and in adequate thermal contact therewith are positioned jacketed cooling collars 24 having connections 25 to a supply of water, or other cooling media, of suitable temperature for cooling the thermoplastic and outlets 26 for exhausting the water after it has served its function as a cooling medium.

The forming pin or mandrel 11 is provided with a centrally located passageway 30 therethrough for the transmittal of compressed air for inflating the extruded tubing. Air enters the passageway 30 through a port 31 in the heating head 10. Connected to the port 31 is a pipe line 32 containing compressed air or any inert gas, such as nitrogen or carbon dioxide, when the thermoplastic is susceptible at elevated temperature to deterioration by the oxygen content of air.

Figure 3:
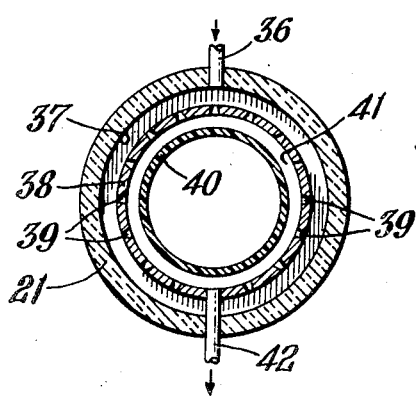
Fig. 3 is an enlarged cross-sectional view taken along the line 3—3 of Fig. 1 and shows in greater detail the constructional features for introducing the supporting elastic fluid around the extruded tube.

Leading off from the compressed air pipe 32 is a branch pipe 36 connected to the heat insulating bushing 21. Air flows from the branch pipe 36 into an annular space 37 provided for in the bushing 21, and escapes therefrom through a perforated ring 38 mounted within the annular space 37 as shown in greater detail in Fig. 3. Orifices 39 in the ring 38 radially direct the air against the tube 40 of thermoplastic material in such manner that all of the circumferential areas of the tubing are uniformly contacted by the air. The air then escapes from the annular space 41 existing between the thermoplastic tube and the inner radial face of the ring 38 through an exhaust pipe 42, the rate of escape to the atmosphere being controlled by a bleeder valve 43.

Figure 2:
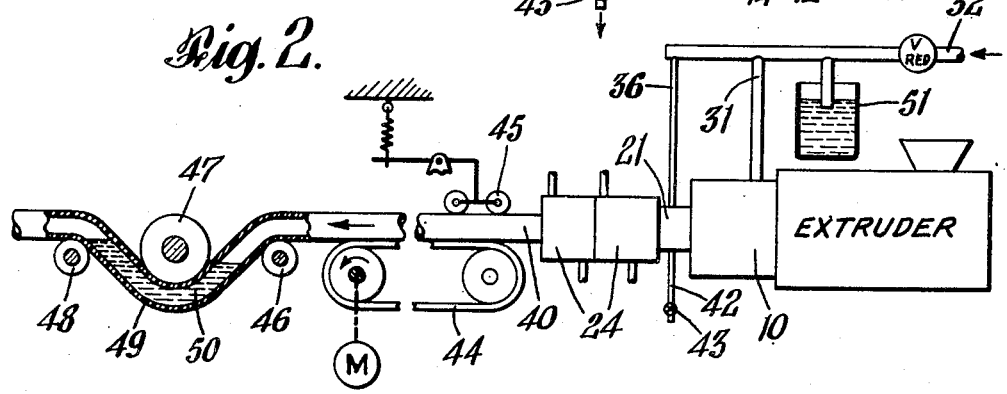
Fig. 2 is a diagrammatic side elevation of a complete apparatus for extruding thermoplastic tubing, expanding, shaping and cooling the tubing, and means for continuously retaining the inflating elastic fluid within the tubing while severing the tubing into desired lengths.

The several steps involved in extruding tubular shaped thermoplastic material can best be explained with reference to Fig. 2. To initiate the extrusion operation, thermoplastic material in granular or tape form is loaded into the hopper of the extruder and heated within the extruder to suitable extrusion temperatures and then forced or expressed by the worm of the extruder to the heating head 10. From the heating head, the heat-softened plastic is forced through the annular passage between the forming pin 11 and the complementary die 12 to emerge as a tubular shaped body. Meanwhile air is internally introduced into the tubing through the passageway 30 of the forming pin 11, and is retained in the tubing by temporarily clamping the end of the tubing after it has been pulled out through the cooling sleeve 20. During the starting-up cycle of the process and until the tubing expands against the cooling die, the tubing must be chilled by temporary cooling means such as a cold air blast or water spray to prevent overexpansion or blowouts of that portion of the tubing which has gone through the cooling die without making cooling contact therewith. The tubing is then deposited on a self powered conveyor belt 44 travelling at a speed approximately the same or somewhat faster than the free rate of extrusion; idler rolls 45 assisted by spring tension press the tubing 40 firmly against the conveyor belt to prevent slippage.

From the conveyor belt 44, the tubing passes over a free idler roll 46, under a second idler roll 47 and then over a third idler roll 48 to form a loop 49, the radius of the loop being determined by the flexibility of the tubing. A second clamp is then applied to the tubing at a point between the cooling die and the idler roll 46 to retain air within the tubing when the first clamp is opened to introduce sufficient water or other suitable non-solvent liquid into the open end of the tube to descend back into the lower portion of the loop 49 to form a liquid sealing trap 50 thereby permitting the tube to be severed into convenient lengths beyond the trap 50 without loss of inflating elastic fluid after the second clamp is removed.

The inflating air or other suitable elastic fluid is supplied to the air line 32 at a constant pressure of about 0.5 to 1.5 pounds above atmospheric pressure depending upon the requirements of the particular thermoplastic being extruded. To prevent surges of air at higher than desired pressures into the air line 32 which would interfere with the production of tubing of uniform wall thickness or which would blow the water out of the sealing trap, an adjustable safety valve 51 is connected in the air line 32 to vent off the excessive pressure. The safety valve 51 can be of simple construction as shown, comprising an open tube immersed to a suitable depth in a container of water adjustable as to height so as to give a lower hydraulic head than the liquid seal 50.

Air in pipe 32 flows through the port 31 and the passageway 30 of the forming pin 11 to escape into the bore of the thermoplastic tubing 40 and is trapped therein by the liquid seal 50 in the loop 49. Upon the air in the tubing 40 attaining pressure above atmospheric, it tends to expand the tubing to a diameter greater than that initially created by the forming pin 11 and the complementary die 12. The degree of expansion of the tubing as it leaves the heating head is controlled by balancing the air pressures within and without the tubing. The pressure of the external supporting air is controlled by the bleeder valve 43 which is so adjusted that the supporting air pressure is maintained constantly at a lesser pressure than the inflating air within the tubing. The differential pressure adjustment is critical in that if substantially equal pressures prevail as by closing the bleeder valve 43, the tubing 40 cannot subsequently expand against the walls of the cooling sleeve 20 but merely floats therethrough in a hot plastic condition to blow up to uncontrollable size upon leaving the cooling sleeve 20. On the other hand, if the supporting air pressure is appreciably lower than the inflating air pressure then the tubing tends to expand immediately as it leaves the heating head 10 and may jam or stick against the bushing 21.

With a suitable pressure differential between the inflating air and the supporting air, usually about 1 to 8 ounces pressure, the tubing does not expand appreciably while moving through the bore of the bushing 21, but shortly after entering the cooling sleeve 20, the higher inflating air pressure overcomes the resistance of the external supporting air and expands the hot plastic tubing against the discontinuous interior wall surface of the cooling die. With continued contact against the cooling die, the tubing is chilled to a non-plastic condition to freeze therein the shape and dimensions imparted by the cooling sleeve before the tubing emerges therefrom.

The presence of condensation vapor in the air discharged from the exhaust pipe 42 has been observed, such vapor probably being a mixture of volatile matter which may include plasticizer, lubricant, moisture, residual monomeric constituents and gaseous decomposition products resulting from the effects of the high temperature on the thermoplastic material while in the extruder. Whether or not such volatile matter sweating out to the tubing surface is a primary cause of sticking has yet to be definitely established. In any event, its partial to complete removal by the elastic supporting fluid does not noticeably impair the surface finish or other properties of the thermoplastic.

The outer surface appearance of the finished tubing, such as gloss and smoothness, has been found to be primarily dependent upon the temperature of the plastic as it is extruded, higher temperatures favoring gloss and luster, and the surface finish of the annular die 12 which is usually highly polished; and only secondarily dependent upon the surface finish of the cooling die or sleeve 20. For example, a cooling sleeve 20 made from a tubular section of 18-8 stainless steel was first polished mirror smooth throughout the bore. In such condition it was found to be unusable because the thermoplastic material would stick objectionably thereto; but after being immersed for 5 minutes in 28% aqueous hydrochloric acid thereby producing a matte or discontinuous inner surface in substitution for the polished surface, hot plastic tubing could be shaped and cooled therein unattended by objectionable sticking and yet yield a final cooled tube having a lustrous surface finish despite the matte finish of the cooling die. In another instance a cooling sleeve was constructed of tool steel, the molding surfaces of which were first polished mirror smooth then etched by immersion in 20% aqueous nitric acid for 4 minutes, after which it was chromium plated to prevent loss of the etched surface by abrasion from thermoplastic materials containing abrasive fillers. The discontinuous surface of this cooling sleeve was also characterized by lack of adhesion to hot thermoplastic materials and yet a thermoplastic tubular shape of good surface luster was obtained.

As was previously stated, it is believed that hot thermoplastic tubing in passing through a cooling sleeve having a discontinuous molding surface does not make a substantial overall contact with the sleeve surface, but instead is more or less held away from the sleeve by the supporting elastic fluid adsorbed on the tubing and that some of the elastic fluid is then entrapped in the surface pockets created by the etching or abrading treatment and functions as a gaseous lubricant in preventing contact of the plastic with the undercut areas in the discontinuous surface.

Figure 4:
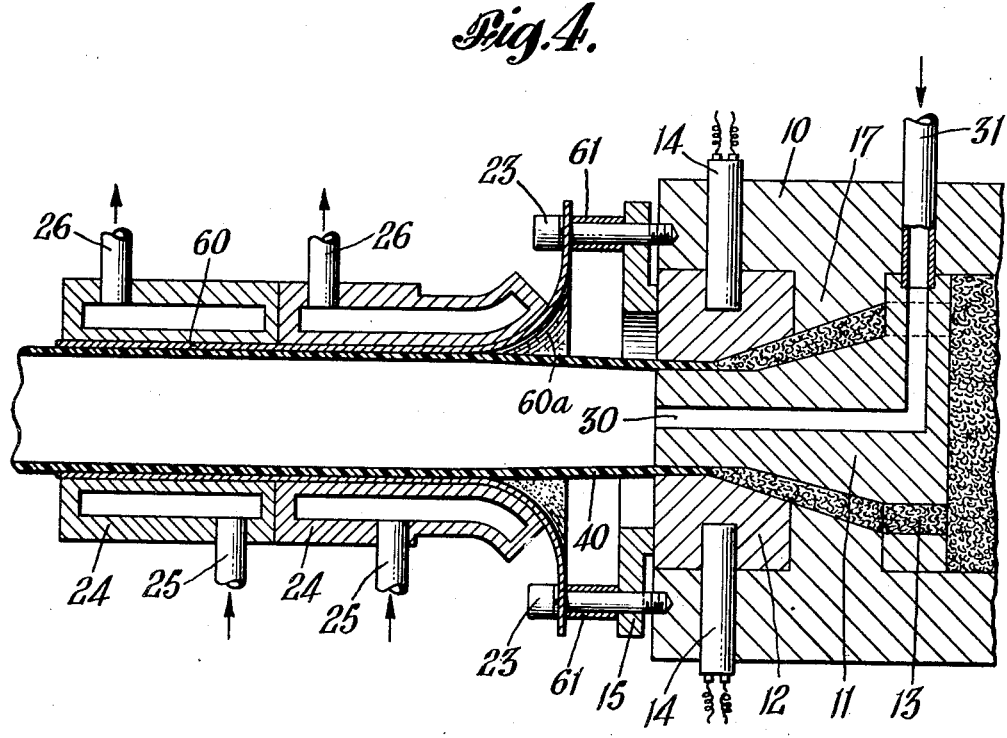
Fig. 4 is a diagrammatic horizontal sectional view of an extruder head having means for inflating extruded tubing, means for exposing the hot extruded tubing to atmospheric air before contacting a cooling die, and a cooling die having discontinuous molding surfaces.
Figure 5:
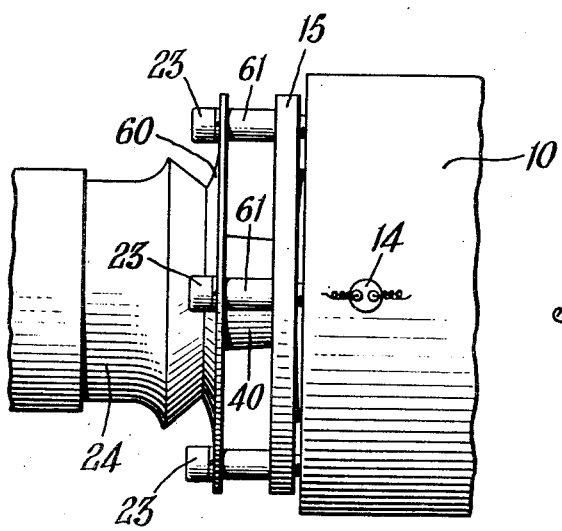
Fig. 5 is a fragmentary side elevation of the apparatus of Fig. 4 further illustrating the assembly of the cooling die 60 and the extruder heating head 10 in Fig. 4, and the spaced openings between the head and die for access of atmospheric air to the hot extruded tubing.

Alternatively for purposes of reducing or eliminating sticking in the cooling die instead of using an elastic supporting fluid at pressure above atmospheric, air at atmospheric pressure can be used to contact the hot extruded tubing before it enters a cooling sleeve having a discontinuous molding surface. As shown in Figs. 4 and 5 this modification uses a cooling sleeve 60 having a discontinuous molding surface 60a preferably provided with a bell mouth entrance to facilitate entry of the hot thermoplastic tubing because expansion of the tubing is now not automatically controlled but must be manually controlled by careful adjustment of the pressure of the inflating air supplied through the port 31. The bell mouth cooling sleeve 60 is attached to the heating or delivery head 10 of the extruder by bolts 23, but is spaced apart from the heating head 10 by spacers 61 for a sufficient distance of at least about ⅜ of an inch to permit not only visual inspection of the tubing 40 as it moves from the delivery end 10 of the extruder to the cooling sleeve 60 but also to allow for the entry of atmospheric air to contact the hot tubing and to be drawn into the cooling sleeve to function as a lubricant.

In both forms of apparatus cooling sleeves of a length between 6 to 10 inches and in good thermal contact with jacketed cooling collars are usually adequate for thoroughly chilling or hardening thermoplastic tubing having a wall thickness less than 0.030 inch and moving through the die at a linear speed of about 60 feet per minute.

The cooling sleeve 20 can be other than circular in cross-sectional shape, for instance, sleeves having a square or rectangular section or even polygonal cross-sections can be employed in conjunction with an extruder having a simple circular annular hot die in the heating head. Therefore it is possible to obtain a wide variety of tubular shaped articles merely by substituting one cooling sleeve die for another without requiring a change in the heating head die.

Preferably for ease of entry of the tubing the internal diameter of the cooling sleeve is larger than the annulus of the heating head dies. The internal diameter can be constant throughout the length of the sleeve for use with thermoplastic materials such as vinyl copolymer molding resins that have negligible amounts of mold shrinkage. Some thermoplastics, however, such as cellulose acetate and cellulose acetate-butyrate, exhibit such a high degree of mold shrinkage on cooling that it may be desirable to make the cooling sleeve with the internal diameter tapering slightly in a direction away from the heating head, so that the plastic tubing even while shrinking continues to maintain contact with the sleeve, to the end that the entire mass and not only the surface skin of the tubing is chilled below the softening temperature of the thermoplastic material.

To illustrate such dimensions, plastic tubing was produced on a continuous basis with an internal diameter of 1.250 inches ±0.002" and a wall thickness of 0.020 inch ±0.001" from a cellulose acetate-butyrate molding composition. The forming pin of the extruder had a diameter of 0.584 inch and the forming or complementary die a bore of 0.674 inch diameter. The hot plastic tubing issuing from the annular space between the pin and the die was externally supported on an air cushion having a slightly lower pressure by a few ounces than the 0.5 to 1.0 p. s. i. of the inflating air pressure introduced into the tubing from the passageway in the forming pin. The hot plastic tubing was continuously drawn through and inflated against the internal walls of a 12 inch long brass cooling sleeve die having a discontinuous molding surface protected by chromium plating. The sleeve had a tapered bore of a diameter of 1.292 inches at the entrant end of the sleeve and a diameter of 1.290 inches at the exit end; this amount of taper was adequate to compensate for the normal degree of mold shrinkage occurring with this particular type of thermoplastic material.

The temperature of the elastic supporting fluid for controlling the expansion of the tubing is not critical with respect to the avoidance of sticking and therefore compressed air at room temperatures is a convenient and economical fluid for the purpose with most thermoplastic materials. Temperature, however, is of some importance with respect to possible severe initial chilling effects on the outer skin of the plastic which would prevent subsequent expansion of the tubing in the cooling sleeve die. This trouble can occur when the supporting elastic fluid is quite cold and is constantly exhausted at a rapid rate through a bleeder valve or other pressure controlling means. Again, if the incoming elastic supporting fluid is considerably below the softening temperature of the plastic and is directed locally as a jet against a section of the tubing as would be the case if no diffuser or perforated ring 39 were installed in the bushing 21, then a thickened longitudinal rib effect is obtained in the finished tubing. The rib effect is caused by the plastic having been so locally cooled by the jet of supporting air that that portion expands and thins out less than the remaining hotter peripheral portion of the tube under the influence of the internal inflating air. Such ribs may be desirable for their localized stiffening effect in the ultimate use of the tubing.

Uniform wall thickness of the tubing can be promoted either by means of the diffuser ring 38, whereby the supporting fluid uniformly contacts all of the peripheral surface of the tubing or by using air or other elastic supporting fluid at elevated temperatures above the softening temperature of the plastic. Air at temperatures as high as 200° C. has been used successfully as the supporting fluid for high average molecular weight (16,000 to 24,000 as determined by Staudinger's method) copolymers of vinyl chloride and vinyl acetate. It has been observed that a somewhat better surface gloss or finish is produced on tubing when the supporting air is at elevated temperatures than with air at room temperature.

The apparatus and the methods herein described have been successfully employed with various organic thermoplastic materials representative of the several types of thermoplastic materials having commercial utility. Included among the plastics which have been successfully extruded and then shaped and cooled were plasticized and unplasticized vinyl polymers and copolymers, such as vinyl acetate-vinyl chloride copolymers and cellulose ester plastics, such as cellulose acetate-butyrate and cellulose acetate.

The tubular shapes obtained from practicing the present invention are characterized by accurate dimensions equivalent to that obtained in injection or compression molding of only short tubular lengths and such dimensions are maintained with close tolerances throughout long periods of continuous production.

What is claimed is:

1. Method of forming tubing from thermoplastic material, which comprises extruding the thermoplastic through an annular opening to form a tubular shape in a heat-softened condition enabling a subsequent shaping operation to be performed thereon, introducing elastic fluid into the tubing to expand the tubing, externally exposing the tubing to elastic fluid, and then cooling the tubing to below the thermoplastic materials' softening temperature by passing the tubing while still in a heat-softened condition through a cooling die having discontinuous contact with the tubing.

2. Method of forming tubing from thermoplastic material, which comprises extruding the thermoplastic through an annular opening to form a tubular shape in a heat-softened condition enabling a subsequent shaping operation to be performed thereon, introducing elastic fluid into the tubing to expand the tubing while concurrently externally subjecting the tubing to the pressure of elastic fluid at a lower pressure than the first mentioned fluid to retard the expansion of the tubing, and then cooling the tubing below its heat-softening temperature by passing the tubing while still in a heat-softened condition through a cooling die having a discontinuous mold surface and therein expanding the tubing into contact with said mold surface.

3. Method of forming tubing from thermoplastic material, which comprises extruding the thermoplastic through an annular die to form a tubular shape in a heat-softened condition enabling a subsequent forming operation to be conducted thereon, introducing elastic fluid into the tubing to expand the tubing while concurrently subjecting the external tubing surface to the effect of elastic fluid maintained at a temperature up to the softening point of the thermoplastic material and at a lower pressure than the first mentioned fluid, and then cooling the tubing below its heat-softening temperature by passing the tubing while still in a heat-softened condition through a shaping and cooling die having a discontinuous molding surface, the tubing being expanded therein until it contacts the discontinuous surface.

4. Method of forming tubing having localized longitudinally thickened walls which comprises extruding the thermoplastic through an annular die to form a tubular shape of uniform wall thickness and in a heat-softened condition enabling it to be reshaped by a subsequent molding operation, introducing elastic fluid into the tubing to expand the tubing, retarding expansion of the tubing by externally subjecting it to a second elastic fluid having a temperature below the softening temperature of the thermoplastic, said second fluid being directed initially against selected peripheral portions of the tubing, and then cooling the tubing to below its heat-softening temperature by passing the tubing while still in a heat-softened condition through a shaping and cooling die and expanding the tubing therein into discontinuous contact with the molding surface of the die.

5. In combination with an extruder for forming thermoplastic tubing, means for introducing an elastic fluid within the tubing as it is extruded, means for externally applying an elastic fluid to the extruded tubing for retarding expansion of the tubing by the first mentioned elastic fluid, and means for shaping and cooling said tubing comprising a tubular die having a discontinuous molding surface.

6. An apparatus as set forth in claim 5 wherein the tubular die has an etched mold surface.

7. An apparatus as set forth in claim 5 wherein the tubular die has a discontinuous molding surface comprising an etched finish protected by an overplating of an abrasion resistant metal.

8. An apparatus as set forth in claim 5 wherein the tubular die is a pressed and sintered powdered metal structure.

9. A shaping and cooling die assembly for attachment to the delivery end of an extruder having an annular die for extruding thermoplastic material in tubular form and means for introducing an elastic fluid within the tubing, said assembly comprising a bushing for attachment to the delivery end of the extruder and having a bore, the diameter of which is at least as large as the annular die of the extruder, an opening through the wall of said bushing for externally receiving and directing elastic fluid into the bore of the bushing, a second opening through the wall of the bushing for discharging the elastic fluid, a tubular metal shaping and cooling sleeve having an internal bore of larger diameter than the annular die, said sleeve being attached to said bushing in axial alignment therewith and having a discontinuous molding surface and means for cooling the sleeve.

10. An apparatus as set forth in claim 9 having a shaping and cooling sleeve with a tapered bore, the degree of taper being adequate to compensate for the mold shrinkage of the thermoplastic material upon cooling.

11. A shaping and cooling die assembly for attachment to the delivery end of an extruder having an annular die for extruding thermoplastic material in tubular form and means for introducing an elastic fluid within the tubing, said assembly comprising a tubular die having discontinuous molding surfaces for contact with the thermoplastic tubing, means for cooling the die, and means for attaching the die in spaced relationship to the delivery end of the extruder permitting egress of air to the external surface of the tubing.

12. A cooling die for cooling and shaping hot thermoplastic material in continuous movement thereover, said die having discontinuous molding surface comprising a substantially level molding surface having a multiplicity of minute depressed areas in the form of shallow pits and pores.

13. A metal cooling die for cooling and shaping hot thermoplastic material in continuous movement thereover, said die having a discontinuous etched molding surface.

14. A metal cooling die for cooling and shaping hot thermoplastic material in continuous movement thereover, said die comprising an etched stainless steel molding surface.

15. A metal cooling die for cooling and shaping hot thermoplastic material in continuous movement thereover, said die comprising etched tool steel molding surfaces.

16. A metal cooling die for cooling and shaping hot thermoplastic material in continuous movement thereover, said die having a molding surface consisting of a sintered powdered metal structure.

17. A metal cooling die for molding and cooling hot organic plastic material coming into contact therewith, said die having a discontinuous molding surface comprising a substantially level molding surface having a multiplicity of minute depressed areas in the form of shallow pits and pores.

18. A metal cooling die for molding and cooling hot organic plastic material coming into contact therewith, said die having a discontinuous etched molding surface.

GEORGE W. JARGSTORFF.
CHARLES A. JOSLIN.

REFERENCES CITED

The following references are of record in the file of this patent:

UNITED STATES PATENTS

| Number | Name | Date |
| --- | --- | --- |
| 1,163,740 | Cohoe | Dec. 14, 1915 |
| 1,196,648 | Bleecker | Aug. 29, 1916 |
| 1,780,948 | Sherman | Nov. 11, 1930 |
| 1,876,256 | Maynard | Sept. 6, 1932 |
| 2,011,160 | Plepp | Aug. 13, 1935 |
| 2,245,640 | Beattie | June 17, 1941 |
| 2,267,488 | Becker | Dec. 23, 1941 |
| 2,287,830 | Postlewaite | June 30, 1942 |
| 2,307,034 | Gaevzle | Jan. 5, 1943 |
| 2,320,564 | Brooks | June 1, 1943 |
| 2,335,308 | Bendergrast | Nov. 30, 1943 |
| 2,337,927 | Reichel et al. | Dec. 28, 1943 |
| 2,365,374 | Bailey | Dec. 19, 1944 |
| 2,417,165 | Jacobson | Mar. 11, 1947 |